US006479603B1

(12) United States Patent
Yang et al.

(10) Patent No.: US 6,479,603 B1
(45) Date of Patent: Nov. 12, 2002

(54) METHOD FOR LIVING FREE-RADICAL POLYMERIZATION

(75) Inventors: Yuliang Yang; Junpo He; Jizhuang Cao; Jingming Chen; Chengming Li, all of Shanghai (CN)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/868,077

(22) PCT Filed: Dec. 14, 1999

(86) PCT No.: PCT/EP99/09933

§ 371 (c)(1),
(2), (4) Date: Jun. 14, 2001

(87) PCT Pub. No.: WO00/35962

PCT Pub. Date: Jun. 22, 2000

(30) Foreign Application Priority Data

Dec. 16, 1998 (DE) .......................................... 198 58 098

(51) Int. Cl.[7] ................................ C08F 4/32; C08F 4/00
(52) U.S. Cl. ...................... 526/204; 526/193; 526/227; 526/229; 526/232.1; 526/240; 526/265; 526/310; 526/318.2; 526/328; 526/329.7; 526/335; 526/346
(58) Field of Search ................................. 526/193, 204, 526/232.1, 335, 227, 229, 240, 265, 310, 318.2, 328, 329.7, 346

(56) References Cited

U.S. PATENT DOCUMENTS 5,919,871 A    7/1999   Nicol et al. .................. 525/333
6,117,961 A *  9/2000   Ogawa .................... 526/204 X
6,286,441 B1 * 7/2001   Lynch et al. ............. 526/204 X

FOREIGN PATENT DOCUMENTS

DE    198 03 098    7/1999
EP    0 726 280     8/1996

OTHER PUBLICATIONS

Bing et al. "Well–defined multi–branch copolymer synthesis by "living" free radical polymerization" China Synthetic Rubber Ind. vol. 22 (1999) p. 373.

Bartoh et al. "On the use of inhibitors partially soluble in the aqueous phase" Makromol. Chem. vol. 190 (1989) pp. 769–775.

* cited by examiner

Primary Examiner—Fred Teskin
(74) Attorney, Agent, or Firm—Keil & Weinkauf

(57) ABSTRACT

The invention provides a process for the living free radical addition polymerization of one or more ethylenically unsaturated monomers using at least one free-radical polymerization initiator and in the presence of one or more stable N-oxyl radicals, wherein at least one stable N-oxyl radical has polymerizable double bonds. The invention additionally provides polymers obtainable by this process, having a polydispersity index PDI of from 1.0 to 1.8, and provides for the use of stable N-oxyl radicals having polymerizable double bonds in the living free radical addition polymerization of one or more different ethylenically unsaturated monomers.

7 Claims, 3 Drawing Sheets

METHOD FOR LIVING FREE-RADICAL POLYMERIZATION

Figure 1:
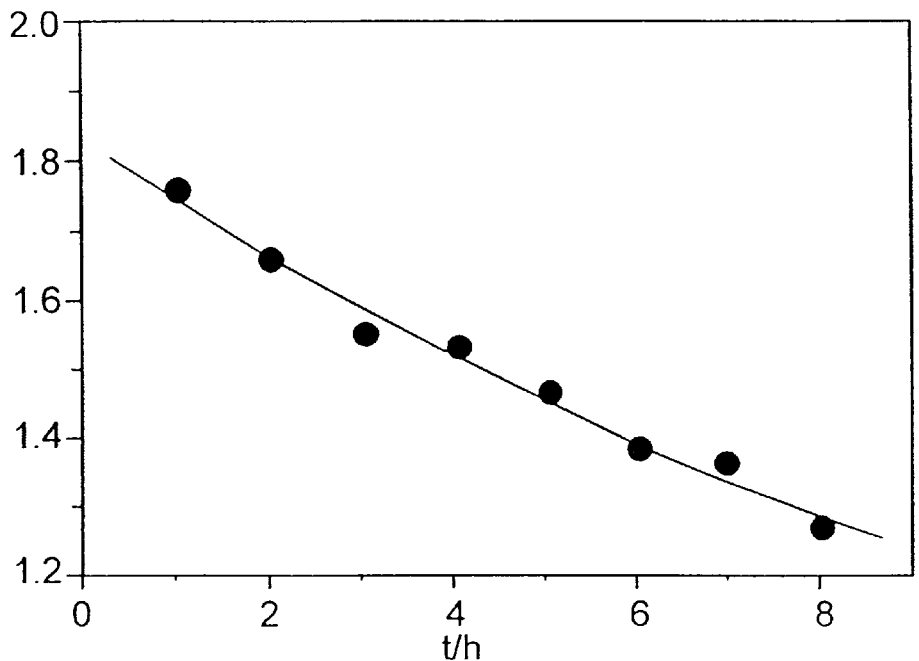

The invention relates to a process for the living free radical addition polymerization of ethylenically unsaturated monomers in the presence of a stable N-oxyl radical.

Free-radically initiated polymerizations of monomers having at least one ethylenically unsaturated group have the disadvantages that the molecular weight of the polymer chains does not normally increase with the degree of polymerization conversion and that the polymer chains of the resulting polymer are not generally of uniform molecular weight. In other words, and in terms of the molecular weight parameter, the polymer obtainable is generally not monodisperse but usually has a polydispersity index PDI in this regard of $\geq 2$ (PDI=$\overline{M}_w/\overline{M}_n$, where $\overline{M}_w$=weight-average molecular weight and $\overline{M}_n$=number-average molecular weight). This can probably be attributed to termination reactions as a result of the irreversible combination of growing free radical polymerization chain ends in particular and to chain transfer reactions, disproportionation, and elimination.

Another disadvantage of conventional free-radically initiated polymerization is that a change made during polymerization to the monomers that are to be polymerized does not generally result in segmented copolymers (block polymers). For example, a change in monomers in the course of emulsion polymerization results in core-shell polymer particles with a core composed of one type of monomer and a shell composed of the other type of monomer, the bond between core and shell being primarily not chemical but merely physical. Accordingly, in the case of conventional free-radical polymerization, the phase attachment of the shell to its core is in some cases inadequate.

It is known from the prior art that by carrying out free-radically initiated polymerization reactions at temperatures above 100° C. in the presence of a stable (essentially noninitiating) N-oxyl radical it is possible to control the free-radically initiated polymerization. For example, the application DE-A 19 803 098, whose priority date is earlier than that of the present application, discloses free-radically initiated aqueous emulsion polymerizations using stable N-oxyl radicals.

The mechanism on which the action is based is presumed to be that the stable N-oxyl radicals do not irreversibly terminate but merely temporarily block reactive radical ends of a growing polymer chain at elevated temperatures. The result of this is a reduction in the steady-state concentration of growing free-radical polymer chain ends, thereby reducing the possibility for irreversible termination of chain growth through the combination of two growing polymer chain ends. This leads on average to polymer chains which grow in (ideally linear) proportion with the polymerization conversion. The result of the latter is an average molecular weight which grows in (ideally linear) proportion with the polymerization conversion, with the resulting polymer having a polydispersity index (PDI) which is ideally 1. At the same time, however, the reduction in the steady-state concentration of growing free radical polymerization chain ends results in a very low polymerization rate.

It is an object of the present invention to increase the polymerization rate in a polymerization of this kind, preferably without substantially increasing the polydispersity of the resulting polymer.

We have found that this object is achieved by a process for the living free radical addition polymerization of one or more ethylenically unsaturated monomers using at least one free-radical polymerization initiator and in the presence of one or more stable N-oxyl radicals. The process of the invention then comprises the feature that at least one stable N-oxyl radical has polymerizable double bonds.

The availability of an easy-to-implement, rapid, controlled, free-radically initiated polymerization for preparing polymers would be advantageous insofar as it would enable the molecular weight of the polymer to be adjusted in a controlled manner within appropriate reaction times. Furthermore, it opens up direct access to block copolymers, since the free radical polymer chain ends are not destroyed by a combination but instead are merely blocked reversibly. In other words, following the consumption of a first type of monomer, the polymerization can be continued with the addition of further types of monomer.

Furthermore, by increasing the polymerization rate and at the same time utilizing the advantages of stable N-oxyl radicals, the long polymerization times are reduced. Accordingly, a practicable and economic process is provided.

In accordance with the invention, the polymerization is carried out using at least one stable N-oxyl radical which has polymerizable double bonds.

The presumed mechanism is based on the ability of the stable N-oxyl radical, owing to its polymerizable double bonds, to participate in the polymerization together with the ethylenically unsaturated monomers. At the same time, the stable N-oxyl radical is able temporarily to block reactive radical ends of a growing polymer chain and so lead to a reduction in the steady-state concentration of growing free radical polymer chain ends, thereby reducing the possibility of irreversible termination of chain growth through the combination of two growing polymer chain ends. As a result of the polymerization of the stable N-oxyl radicals, the concentration of free stable N-oxyl radicals reduces as the polymerization progresses, and fewer polymer chain ends are reversibly blocked. The consequence of this is an increase in the reaction rate.

The stable N-oxyl radical having polymerizable double bonds is preferably a compound with the formula I or II or a mixture thereof.

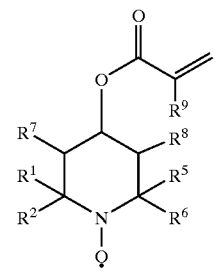

(I)

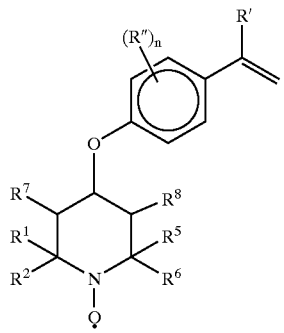

(II)

where
R$^1$, R$^2$, R$^5$, R$^6$=independently of one another identical or different straight-chain or branched, substituted or unsubstituted alkyl groups having 1 to 32 carbon atoms, it being possible for R$^1$ and R$^2$ and, respectively, R$^5$ and R$^6$ to form a ring system;
R$^7$, R$^8$=independently of one another

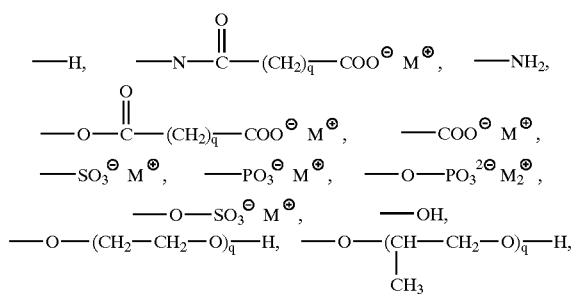

M$^+$=hydrogen ion or an alkali metal ion,
q=an integer from 1 to 10; and
R$^9$ in formula I=hydrogen or C$_1$–C$_8$ alkyl; and
R' and R" in formula II=independently of one another hydrogen or C$_1$–C$_8$ alkyl and n=0, 1, 2 or 3.
Preferably
R$^1$, R$^2$, R$^5$, R$^6$ and R$^9$ in formula I=independently of one another identical or different straight-chain or branched, substituted or unsubstituted alkyl groups having 1 to 3 carbon atoms.

With particular preference, R$^1$, R$^2$, R$^5$, R$^6$ and R$^9$ in formula I are methyl groups.

With very particular preference, a compound of the formula I is used where R$^1$, R$^2$, R$^5$, R$^6$ and R$^9$=methyl and R$^7$ and R$^8$=—H.

Accordingly, very particular preference is given to the use of 4-methacryloyloxy-2,2,6,6-tetramethylpiperidine-1-oxy (MTEMPO). MTEMPO can be prepared by a method which is described in T. Kurosaki, J. Polym. Sci.: Polym. Chem. Ed. 1972, 10, 3295.

The stable N-oxyl radical having polymerizable double bonds, with particular preference MTEMPO, is generally used in a molar fraction of from 0.05 to 1%, preferably from 0.1 to 1%, with particular preference from 0.2 to 0.4%, based on monomer employed.

Further suitable stable N-oxyl radicals which can be used together with the stable N-oxyl radical having polymerizable double bonds are all those specified in DE-A-19 803 098, which has an earlier priority date than, but was unpublished at the priority date of; the present application.

Further stable N-oxyl radicals which can be used are preferably compounds of the formula III, which are derived from a secondary amine:

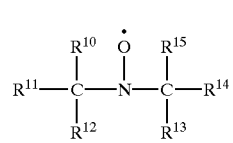

(III)

where R$^{10}$, R$^{11}$, R$^{14}$ and R$^{15}$=identical or different straight-chain or branched, substituted or unsubstituted alkyl groups, and
R$^{12}$ and R$^{13}$=identical or different straight-chain or branched, substituted or unsubstituted alkyl groups or R$^{12}$CNCR$^{13}$=part of a cyclic structure with or without another saturated or aromatic ring fused on, the cyclic structure or the aromatic ring being substituted or unsubstituted.

Examples thereof are stable N-oxyl radicals of the formula III in which R$^{10}$, R$^{11}$, R$^{14}$ and R$^{15}$ are (identical or different) methyl, ethyl, n-propyl, isopropyl, n-butyl, isobutyl, tert-butyl, linear or branched pentyl, phenyl or substituted groups thereof and R$^{12}$ and R$^{13}$ are (identical or different) methyl, ethyl, n-propyl, isopropyl, n-butyl, isobutyl, tert-butyl, linear or branched pentyl, substituted groups thereof or, where R$^{12}$CNCR$^{13}$ forms part of a cyclic structure, are the cyclic structure

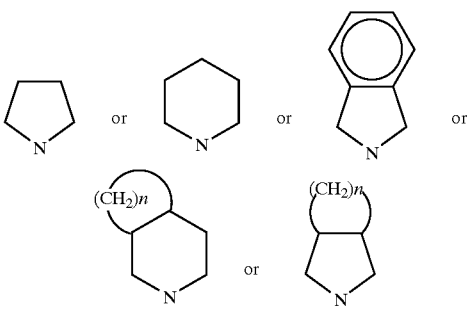

where n=an integer from 1 to 10, preferably from 1 to 6, including substituted cyclic groups of this kind. Exemplary representatives that may be mentioned are 2,2,6,-tetramethylpiperine-1oxyl, 2,2,5,5-tetramethyl-pyrrolidine-1-oxyl and 4-oxo-2,2,6,6-tetramethyl-piperidine-1-oxyl.

The stable N-oxyl radicals can be prepared from the corresponding secondary amines by oxidation, for example, with hydrogen peroxide. In general they can be prepared as the pure substance.

Further stable N-oxyl radicals suitable in the process of the invention are described in DE-A-19 803 098.

Particular preference is given to the use of the stable N-oxyl radicals 2,2,6,6-tetramethyl-1-piperidinyloxy (TEMPO), 4-hydroxy-2,2,6,6-tetramethyl-1-piperidinyloxy (HO-TEMPO), and di-tert-butyl nitroxide (DTBN).

In accordance with the invention, it is also possible to use mixtures of stable N-oxyl radicals.

Preferably, a stable N-oxyl radical having poly-merizable double bonds is used together with a further N-oxyl radical in the process of the invention. In this case, a mixture of MTEMPO and HO-TEMPO is particularly preferred.

The fraction of MTEMPO in the mixture of the N-oxyl radicals is from 10 to 100 mol %, preferably 15 to 100 mol %, with particular preference from 20 to 100 mol %.

The polymerization is initiated with at least one free-radical polymerization initiator. Compounds of this kind are known to the skilled worker.

It is preferred to use free-radical polymerization initiators having a decomposition constant of between $10^{-1}$ and $10^{-5}$ $s^{-1}$ at 115° C., preferably between $10^{-2}$ and $10^{-4}$ $s^{-1}$, with particular preference between $10^{-1}$ and $10^{-1}$ $s^{-1}$.

Use is made, for example, of organic peroxides, organic hydroperoxides and/or azo compounds as free-radical polymerization initiators.

Very particular preference is given to dilauryl peroxide and dibenzoyl peroxide, especially dibenzoyl peroxide.

Preferred azo compounds are 2,2'-azobis(2-methylbutyronitrile) and 2,2'-azobis(isobutyronitrile). 2,2'-Azobis(isobutyronitrile) is particularly preferred.

Likewise a very particular preference is given to those initiators which have a cyclic structure. Cyclic organic peroxides and cyclic azo compounds are particularly suitable. An example that may be mentioned of cyclic organic peroxides is 3,6,9-triethyl-3,6,9-trimethyl-1,4,7-triperoxononane.

The use of said cyclic initiators makes it possible to prepare polymers having reversibly crosslinked structures.

Depending on the aggregate state of the initiator and its solubility behavior, it can be added as such, but preferably as a solution, emulsion (liquid in liquid) or suspension (solid in liquid), by means of which small amounts of initiator, in particular, can be metered with greater precision. Suitable solvents or liquid phase for the initiator are organic solvents such as benzene, toluene, ethylbenzene and cyclohexane, especially cyclohexane, or else the monomers themselves. If the monomers themselves are used as the solvent or liquid phase for the initiator, the initiator is dissolved or emulsified/suspended in the totality of the monomers or, preferably, in a relatively small fraction of the monomers, and this fraction is then added to the remaining components.

It is also possible to dissolve the initiator in the solvent or in the monomer and to disperse the resulting solution in water.

The amount of free-radical polymerization initiator is usually from 0.05 to 4% by weight, preferably from 0.1 to 2% by weight, with particular preference from 0.15 to 1% by weight, based on the amount of the monomers.

The initiators are usually added directly prior to the beginning of the polymerization. It is, however, also possible to add the initiator continuously or a little at a time during polymerization. Of course, a mixture of two or more initiators can also be used.

Suitable monomers are all ethylenically unsaturated monomers which can be polymerized free-radically, i.e., which undergo addition polymerization in the presence of so-called free radicals.

Examples of suitable monomers having at least one ethylenically unsaturated group are: olefins such as ethylene or propylene, vinylaromatic monomers such as styrene, divinylbenzene, 2-vinylnaphthalene and 9-vinylanthracene, substituted vinylaromatic monomers such as p-methylstyrene, α-methylstyrene, o-chloro-styrene, p-chlorostyrene, 2,4-dimethylstyrene, 4-vinyl-biphenyl and vinyltoluene, esters of vinyl alcohol and monocarboxylic acids of 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids having 3 to 6 carbon atoms, such as in particular acrylic acid, methacrylic acid, maleic acid, ftinaric acid and itaconic acid, with alkanols having generally 1 to 20, preferably 1 to 12, with particular preference from 1 to 8 and, with very particular preference, 1 to 4, carbon atoms, such as in particular methyl, ethyl, n-butyl, isobutyl, tert-butyl and 2-ethylhexyl acrylate and methacrylate, dimethyl maleate or maleic acid n-butyl ester, the nitriles of the abovementioned α,β-monoethylenically unsaturated carboxylic acids, such as acrylonitrile and methacrylonitrile, and also $C_{4-8}$ conjugated dienes such as 1,3-butadiene and isoprene.

Suitable styrene compounds are those of the formula IV:

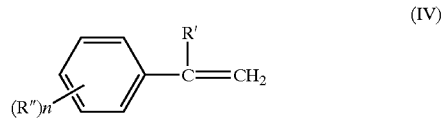

(IV)

where R' and R" independently of one another are H or $C_1$–$C_8$ alkyl and n is 0, 1, 2 or 3.

Accordingly, in the process of the invention it is preferred to use ethylenically unsaturated monomers selected from
    styrene compounds of the formula IV,
    $C_1$–$C_{20}$ alkyl esters of acrylic acid or methacrylic acid,
    dienes having conjugated double bonds,
    ethylenically unsaturated dicarboxylic acids and derivatives thereof, and
    ethylenically unsaturated nitrile compounds.

Particular preference is given to the use in the process of the invention of the monomers styrene, α-methylstyrene, divinylbenzene, vinyltoluene, $C_1$–$C_8$ alkyl (meth)acrylates, especially n-butyl acrylate, 2-ethylhexyl acrylate or methyl methacrylate, and butadiene, and also acrylonitrile, and monomer mixtures composed to the extent of at least 85% by weight of the abovementioned monomers or mixtures of the abovementioned monomers, with very particular preference being given to styrene and methylmeth-acrylate.

In the preparation of polymers it is also possible, for example, to use crosslinking monomers as well. Crosslinking monomers are bifunctional or poly-functional comonomers having at least two olefinic double bonds, examples being butadiene and isoprene, divinyl esters of dicarboxylic acids such as succinic acid and adipic acid, diallyl and divinyl ethers, bifunctional alcohols such as ethylene glycol and 1,4-butanediol, the esters of acrylic acid and methacrylic acid with said bifunctional alcohols, 1,4-divinylbenzene, and triallyl cyanurate. Particular preference is given to the acrylic ester of tricyclodecenyl alcohol, which is known by the name dihydrodicyclopentadienyl acrylate, and to the allyl esters of acrylic acid and of methacrylic acid.

The process of the invention is suitable for all known methods of free radical polymerization. The process of the invention is preferably conducted as a mass (bulk), solution, suspension, microsuspension, emulsion or microemulsion polymerization, with particular preference as a mass (bulk) polymerization. The polymerizations can be conducted continuously or batchwise. The apparatus used for the polymerization depends on the corresponding polymerization process.

Depending on the polymerization process, further suitable additives may be added. In a microsuspension polymerization process, for example, protective colloids suitable for stabilizing the emulsion may be added. Such protective colloids are water-soluble polymers which envelope the monomer droplets and the polymer particles formed from them and in this way protect against coagulation. Suitable protective colloids are specified in DE-A- 19 803 098. In emulsion polymerization processes, furthermore, emulsifiers suitable for stabilizing the emulsion are added. These are soaplike auxiliaries which envelop the monomer droplets and in this way prevent them from merging.

It is also possible to add additives which give the polymers certain properties. Examples of such additives that may be mentioned include polymers, dyes and pigments, including ferromagnetic pigments.

The fraction of the additives is generally at least 0.1% by weight, preferably at least 0.5% by weight, based on the overall mass of the mixture.

The process of the invention is conducted at temperatures of from 80 to 200° C., preferably from 95 to 160° C., with particular preference from 100 to 140° C. The equilibrium between free polymer chain ends and chain ends blocked reversibly by N-oxyl radicals is dependent on temperature. At a high temperature, a larger number of free polymer chain ends is present.

In general, the polydispersity of the resulting polymers is low. In a number of experiments, however, polymers having a comparatively high polydispersity have also been obtained. For systems in which styrene is polymerized in the presence of HO-TEMPO/MTEMPO in a ratio of 1:1, polydispersities of up to 1.76 and, in the presence of MTEMPO, polydispersities of up to 1.92 are obtained.

The probable reason for these high polydispersities is that, owing to the copolymerization of the MTEMPO radicals into the polymer to be prepared, quasi crosslinked polymers are able to form. In such systems, the copolymerized MTEMPO radicals are free-radical scavengers for the radical polymer chain ends of the growing polymer chain, and so bring about crosslinking. This crosslinking is reversible: it can be destroyed by heating the polymer and regained by cooling.

The polydispersity of these polymers can be lowered by heating to temperatures of generally from 80 to 200° C., preferably from 90 to 160° C., with particular preference from 100 to 130° C., preferably in the presence of acid, with particular preference ascorbic acid. For example, by heating polystyrene prepared in accordance with the invention at 120° C. in the presence of ascorbic acid, polymers having a polydispersity of 1.25 were obtained after 8 hours. Similar effects can be achieved by treatment with free-radical scavengers such as hydroquinone at the stated temperatures.

The present invention additionally provides addition polymers obtainable by the process of the invention which have a polydispersity index PDI of from 1.0 to 1.8, immediately or following treatment with acid at elevated temperature.

Figure 2:
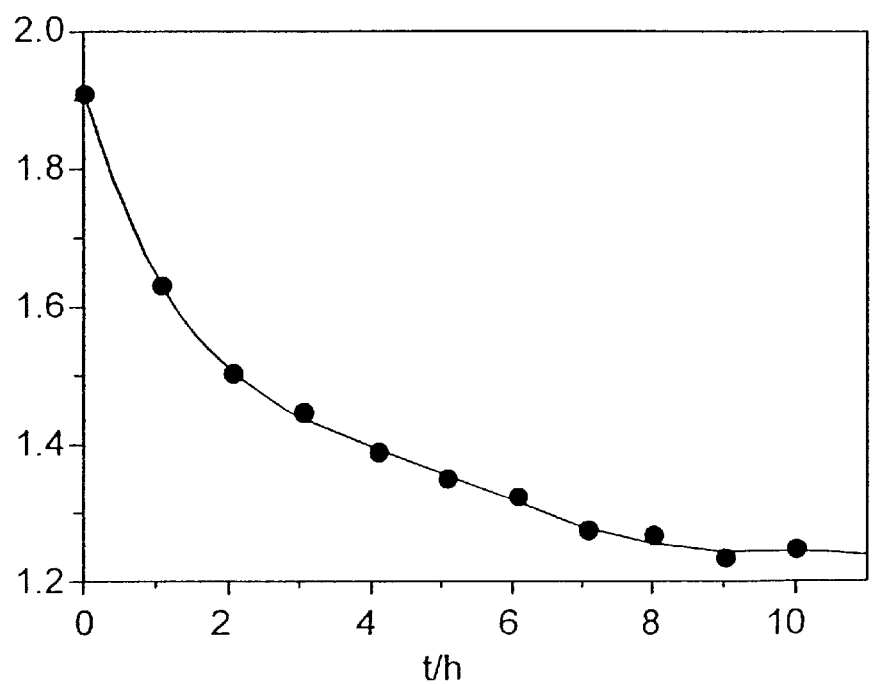

FIG. 1 and FIG. 2 of the attached drawing show the polydispersity of polystyrene as a function of the reaction time with ascorbic acid at 120° C.

The present invention additionally provides for the use of one or more stable N-oxyl radicals having polymerizable double bonds in the living free radical addition polymerization of one or more ethylenically unsaturated monomers.

The following examples further illustrate the invention.

EXAMPLES

Example 1:

(Samples I to VI, Comparative Samples VII, VIII) Living free radical polymerization of methyl methacrylate using polymerizable TEMPO derivatives as stable free radicals MTEMPO and HO-TEMPO (0.0015 mol in total) were dissolved with stirring in 50 g (0.5 mol) of degassed methyl methacrylate in various proportions, which are given in Table 1. The mixture was heated to 100° C. and 0.246 g (0.0015 mol) of AIBN was added in order to initiate polymerization under a nitrogen atmosphere. The molar concentration ratios at the beginning (t=0) were as follows: $[AIBN]_0$=0.3% $[MMA]_0$, $[HO\text{-}TEMPO]_0$+$[MTEMPO]_0$: $[AIBN]_0$= 1:1. After various reaction times (see Table 1) samples were taken and quenched in liquid nitrogen in order to terminate the polymerization.

The degree of conversion in % was measured using a NETZCH T6 209 instrument. The samples were heated from 25° C. to 275° C. under nitrogen at a heating rate of 20 K $min^{-1}$. The weight loss above 275° C. indicated the polymer fraction and, respectively, the conversion of monomer.

The molecular weights were determined by gel permeation chromatography on samples taken directly from the mixture. The analysis is carried out using tetrahydrofuran as eluent with a flow rate of 1 ml/min through three Waters Ultrastyragel columns HR4, HR3 and HR1, connected in series, and using a Waters 410 RI detector.

Figure 3:
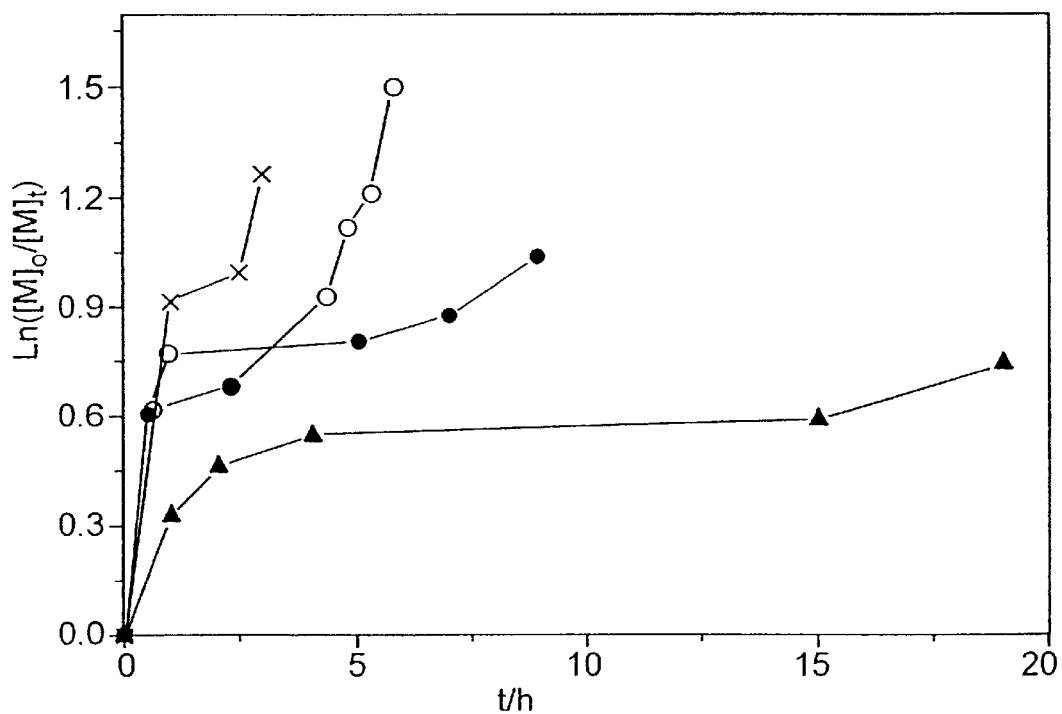

The experimental results can be found in Table 1 and in FIG. 3 of the attached drawing.

TABLE 1

Polymerization of methyl methacrylate in the presence of a mixture of TEMPO derivatives as stable free radicals

| Sample | MTEMPO/ HO-TEMPO [mol %] | Conversion [%] | Time [h] | $M_n$ (× $10^{-3}$) | $M_w$(× $10^{-3}$) | PD |
|---|---|---|---|---|---|---|
| I | 7:3 | 60.2 | 1 | 23.7 | 36.8 | 1.55 |
| II | 7:3 | 71.8 | 3 | 23.7 | 34.6 | 1.46 |
| III | 1:1 | 46.6 | 0.67 | 21.1 | 30.2 | 1.43 |
| IV | 1:1 | 71.9 | 6.2 | 21.0 | 30.8 | 1.47 |
| V | 2:8 | 54.0 | 1 | 20.6 | 30.6 | 1.48 |
| VI | 2:8 | 60.8 | 21 | 20.1 | 30.1 | 1.50 |
| VII | HO-TEMPO only | 28.4 | 4 | 18.9 | 27.8 | 1.47 |
| VIII | HO-TEMPO only | 60.9 | 32 | 19.3 | 27.0 | 1.40 |

With an increase in the MTEMPO/HO-TEMPO ratio, there is a significant increase in the polymerization rate but only a slight change in the polydispersity.

Example 2:

Living free radical polymerization of styrene using polymerizable TEMPO derivatives as stable free radicals The polymerization procedure is as in Example 1 except that styrene is used instead of methyl methacrylate and polymerization is conducted at a temperature of 120° C.

Figure 4A:
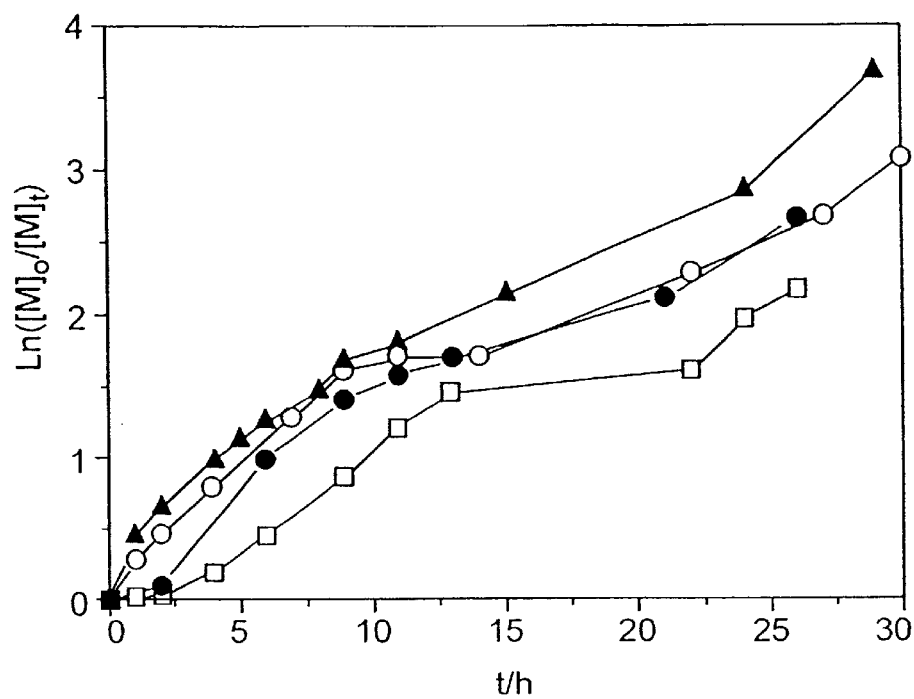
Figure 4B:
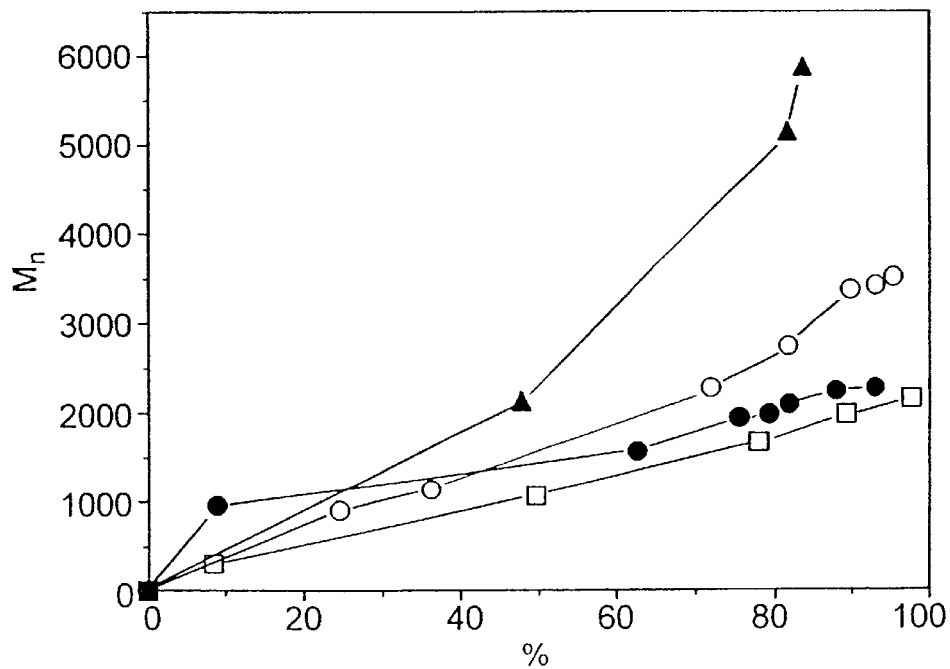

The experimental results are shown in FIG. 4a and FIG. 4b.

The results show that the polymerization rate of a system in which a stable free radical having polymerizable double bonds is used is greater by a factor of approximately 2 than that of systems in which only a stable free radical without polymerizable double bonds is used.

The figures show the following:

FIG. 1 Polydispersity of polystyrene as a function of reaction time with ascorbic acid at 120° C. in the presence of HO-TEMPO and MTEMPO in a ratio of 1:1

The polydispersity is indicated on the ordinate axis and the reaction time in hours on the abscissa.

FIG. 2 Polydispersity of polystyrene as a function of reaction time with ascorbic acid at 120° C. in the presence of MTEMPO The polydispersity is indicated on the ordinate axis and the reaction time in hours on the abscissa.

FIG. 3 Experimental results from Example 1

Kinetic plot relating to the living free radical polymerization of methyl methacrylate at 100° C.

The ordinate axis indicates $Ln([M]_0/[M]_t)$, where $[M]_0$ is the monomer concentration at polymerization time 0 h and $[M]_t$ is the monomer concentration at polymerization time t h, and the abscissa indicates the reaction time in hours (h).

The meanings of the symbols therein are as follows:

crosses: plot at a molar ratio MTEMPO:HO-TEMPO=7:3 hollow circles: plot at a molar ratio MTEMPO:HO-TEMPO=1:1 solid circles: plot at a molar ratio MTEMPO:HO-TEMPO=2:8 triangles: HO-TEMPO only (comparative example)

FIG. 4a Experimental results from Example 2

Kinetic plot relating to the living free radical polymerization of styrene at 120° C.

The ordinate axis indicates $Ln([M]_0/[M]_t)$, where $[M]_0$ is the monomer concentration at polymerization time 0 h and $[M]_t$ is the monomer concentration at polymerization time t h, and the abscissa indicates the reaction time in hours (h).

FIG. 4b Molecular weight as a function of degree of conversion in the living free radical polymerization of styrene at 120° C.

The molecular weight $M_n$ (measured by gel permeation chromatography) is indicated on the ordinate axis and the degree of conversion in % on the abscissa.

In FIG. 4a and FIG. 4b the symbols have the following meanings:

solid circles: plot at a molar ratio HO-TEMPO:benzoyl peroxide (BPO)=1:1 empty squares: plot at a molar ratio HO-TEMPO:benzoyl peroxide (BPO)=1.2:1 hollow circles: Plot at a molar ratio MTEMPO:HO-TEMPO =1:1 and total TEMPO:BPO=1:1 triangles: MTEMPO only, molar ratio MTEMPO:BPO=1:1

We claim:

1. A process for the living free radical addition polymerization of one or more ethylenically unsaturated monomers using at least one free radical polymerization initiator selected from the group consisting of organic peroxides and inorganic peroxides and in the presence of one or more stable N-oxyl radicals, wherein at least one stable N-oxyl radical is at least one compound of the formula I or II or a mixture of:

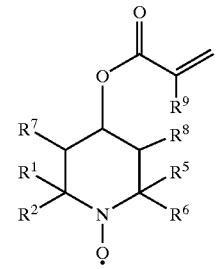

(I)

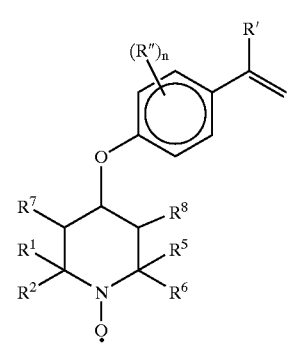

(II)

where $R^1$, $R^2$, $R^5$, $R^6$=independently of one another identical or different straight-chain or branched, substituted or unsubstituted alkyl groups having 1 to 32 carbon atoms, it being possible for $R^1$ and $R^2$ and, respectively, $R^5$ and $R^6$ to form a ring system;

$R^7$, $R^8$=independently of one another

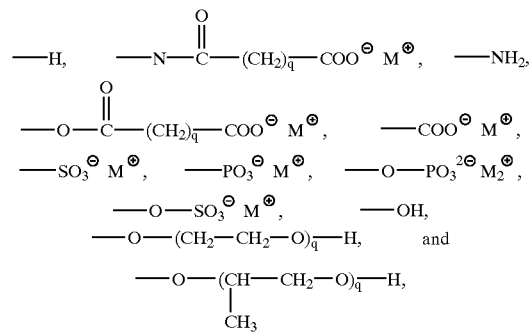

$M^+$=hydrogen ion or an alkali metal ion, q=an integer from 1 to 10; and $R^9$ in formula I=hydrogen or $C_1$–$C_8$ alkyl; and R' and R'' in formula II=independently of one another hydrogen or $C_1$–$C_8$ alkyl and n=0, 1, 2 or 3.

2. The process of claim 1, wherein 4-methacryloyloxy-2,2,6,6-tetramethylpiperidine-1-oxy (MTEMPO) is used.

3. The process of claim 1 wherein further stable N-oxyl radicals used are compounds of the formula III:

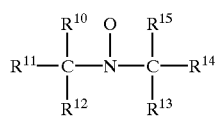

(III)

where $R^{10}$, $R^{11}$, $R^{14}$ and $R^{15}$=identical or different straight-chain or branched, substituted or unsubstituted alkyl groups having 1 to 8 carbon atoms, and $R^{12}$ and $R^{13}$=identical or different straight-chain or branched, substituted or unsubstituted alkyl groups or $R^{12}$CNCR$^{13}$=part of a cyclic structure with or without another saturated or aromatic ring fused on, the cyclic structure or the aromatic ring being substituted or unsubstituted.

4. The process of claim 3, wherein 2,2,6,6-tetramethyl-1-piperidinyloxy (TEMPO), 4-hydroxy-2,2,6,6-tetramethyl-1-piperidinyloxy (HO-TEMPO) or di-tert-butyl nitroxide (DTBN) can be used as further stable N-oxyl radicals.

5. The process of claim 4, wherein a mixture of MTEMPO and HO-TEMPO is used.

6. The process of claim 1, wherein dibenzoyl peroxide or dilauryl peroxide or a mixture thereof is used as free-radical polymerization initiator.

7. The process of claim 1, wherein the ethylenically unsaturated monomer is selected from styrene compounds of the formula IV

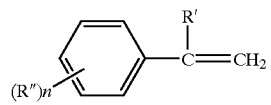

(IV)

where R' and R" independently of one another are H or $C_1$–$C_8$ alkyl and n is 0, 1, 2 or 3, $C_1$–$C_{20}$ alkyl esters of acrylic acid or methacrylic acid, dienes having conjugated double bonds, ethylenically unsaturated dicarboxylic acids, and ethylenically unsaturated nitrile compounds.

* * * * *